US012633792B2

(12) United States Patent
Gerard et al.

(10) Patent No.: US 12,633,792 B2
(45) Date of Patent: May 19, 2026

(54) STATOR COOLED ELECTRIC MOTOR

(71) Applicant: Garrett Transportation I Inc.,
Torrance, CA (US)

(72) Inventors: Arnaud Gerard, Epinal (FR);
Maxence Lambert, Girancourt (FR);
Michel Mosser, Thiebaumenil (FR);
Romain Jeannot, Crépey (FR)

(73) Assignee: Garrett Transportation I Inc.,
Torrance, CA (US)

( * ) Notice: Subject to any disclaimer, the term of this
patent is extended or adjusted under 35
U.S.C. 154(b) by 0 days.

(21) Appl. No.: 18/786,627

(22) Filed: Jul. 29, 2024

(65) Prior Publication Data

US 2026/0031671 A1 Jan. 29, 2026

(51) Int. Cl.
| | |
|---|---|
| *H02K 3/24* | (2006.01) |
| *H02K 1/16* | (2006.01) |
| *H02K 1/20* | (2006.01) |
| *H02K 1/32* | (2006.01) |
| *H02K 5/16* | (2006.01) |
| *H02K 5/20* | (2006.01) |
| *H02K 7/14* | (2006.01) |
| *H02K 9/04* | (2006.01) |
| *H02K 9/08* | (2006.01) |
| *H02K 15/066* | (2025.01) |

(52) U.S. Cl.
CPC ................. *H02K 3/24* (2013.01); *H02K 1/16*
(2013.01); *H02K 5/16* (2013.01); *H02K 7/14*
(2013.01); *H02K 1/20* (2013.01); *H02K 1/32*
(2013.01); *H02K 5/207* (2021.01); *H02K 9/04*
(2013.01); *H02K 9/08* (2013.01); *H02K*
*15/066* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,898,246 A | * | 4/1999 | Hoffman | H02K 9/06 |
| | | | | 310/58 |
| 2007/0063594 A1 | * | 3/2007 | Huynh | H02K 9/00 |
| | | | | 310/59 |
| 2010/0266430 A1 | * | 10/2010 | Shimizu | F02B 39/10 |
| | | | | 417/423.8 |
| 2020/0295626 A1 | * | 9/2020 | Yuan | H02K 1/2766 |
| 2022/0247274 A1 | * | 8/2022 | Bremner | H02K 9/197 |
| 2023/0082277 A1 | * | 3/2023 | Goykhman | B64D 33/08 |
| | | | | 310/54 |
| 2023/0110735 A1 | * | 4/2023 | Akiyama | F04D 27/0261 |
| | | | | 417/423.8 |
| 2024/0113595 A1 | * | 4/2024 | Foulsham | H02K 9/19 |

* cited by examiner

*Primary Examiner* — Binh Q Tran
(74) *Attorney, Agent, or Firm* — BelayIP

(57) ABSTRACT
A compressor including an impeller for generating a com-
pressed fluid within a volute, a motor housing having an
inlet for receiving the compressed from the volute, an
electric motor including a plurality of stator windings, a
rotor and a shaft mechanically coupled to the rotor, and a
stator insert having a plurality of holes for regulating a flow
of the compressed fluid through the plurality of stator
windings and restricting a flow of the compressed fluid
through a plurality of gaps between the stator windings.

20 Claims, 5 Drawing Sheets

200

300

350

310

320

340

330

360

400

STATOR COOLED ELECTRIC MOTOR

TECHNICAL FIELD

The present disclosure generally relates to an electric motor cooling apparatus and, more particularly, relates to a system for providing thermal control for an electric motor. More specifically, aspects of the present disclosure relate to systems, methods and devices for providing an improved air flow arrangement for cooling an electric motor housing and electric motor stators while minimizing system pressure drop and windage loss to the electric motor.

BACKGROUND

The ever-increasing use of electric motors in automotive applications continuously introduces new demands for high power, high efficiency and high power density electrical motor drives. For example, some automotive compressors, such as turbochargers, superchargers, or other fluid compression devices can include an electric motor that is operably coupled to the same shaft that supports a compressor wheel, turbine wheel, etc. The electric motor may drivingly rotate the shaft, for example, to assist a turbine stage of the device. While electric motors have a clear efficiency advantage over traditional combustion engines, electric motors still generate heat during operation. For automotive applications, electric motors operate at high voltages and typically draw high levels of electric current, causing internal heat generation. Likewise, in an internal combustion engine setting, these electric motors may be subject to high ambient temperatures resulting from the combustion engine operation, further increasing the internal and external temperatures of the electric motor.

To control electric motor temperature in high temperature applications various cooling strategies have typically been used, such as augmented air cooling and liquid cooling. Augmented air cooling can employ high performance fans, such as axial or centrifugal fans, to push large volumes of air over the motor, increasing heat removal, along with optimized airflow channels. Liquid cooling can employ direct liquid cooling where coolant channels are integrated directly into the stator and rotor windings, and indirect liquid cooling where a coolant jacket surrounds the motor housing, transferring heat to an external radiator or heat exchanger. However in modern automotive electric motor applications, such as e-machine assisted turbocharger applications, as higher power output from the electric motors is demanded and the available space for the motor becomes increasingly constrained, these traditional cooling strategies are becoming increasingly ineffective. Increased air density within the stator and rotor can result in more drag and higher rotational energy losses, thereby rendering augmented air cooling less effective. Thus, it is desirable to provide systems and methods to ensure efficient electric motor cooling in high voltage and high temperature applications while overcoming the aforementioned challenges. Other desirable features and characteristics of the present disclosure will become apparent from the subsequent detailed description and the appended claims, taken in conjunction with the accompanying drawings and this background discussion.

BRIEF SUMMARY

Disclosed herein are fluid compression and motor control methods and systems and related electrical systems for provisioning such systems, methods for making and methods for operating such systems, and motor vehicles and other equipment such as aircraft, ships, wind turbines and other electric vehicles equipped with onboard propulsion systems. By way of example, and not limitation, there are presented various embodiments of systems for providing an air cooled electric motor having improved fluid flow to maximize heat transfer while minimizing system pressure drop and windage loss.

In accordance with an aspect of the present disclosure, a compressor including an impeller for generating a compressed fluid, a motor housing having an inlet for receiving the compressed fluid, an electric motor including a plurality of stator windings, a rotor and a shaft mechanically coupled to the rotor, and a stator insert having a plurality of holes for regulating a flow of the compressed fluid through the plurality of stator windings and regulating a flow of the compressed fluid through a plurality of gaps between the stator windings.

In accordance with another aspect of the present disclosure, a method of cooling an electric motor in a compressor including compressing a fluid to generate a compressed fluid and regulating a flow of the compressed fluid through a plurality of stator windings and a plurality of gaps between the stator windings by a stator insert, wherein the stator insert includes a first plurality of holes aligned with the plurality of stator windings and a second plurality of holes aligned with the plurality of gaps between the stator windings.

In accordance with another aspect of the present disclosure, a compressor including an impeller disposed within an impeller housing for compressing a fluid to generate a compressed fluid within a volute, a motor housing mechanically coupled to the impeller housing, wherein the motor housing includes an inlet for receiving the compressed fluid from the volute, an electric motor having a plurality of stator windings, a rotor and a shaft, wherein the shaft is mechanically coupled to the impeller and the rotor, and a stator insert disposed between the impeller and the electric motor having a first plurality of holes aligned with the plurality of stator windings and a second plurality of holes aligned with a plurality of gaps between the stator windings wherein the stator insert receives the compressed fluid from the inlet and regulates the flow of the compressed fluid through the plurality of stator windings via the first plurality of holes and the plurality of gaps between the stator windings via the second plurality of holes.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
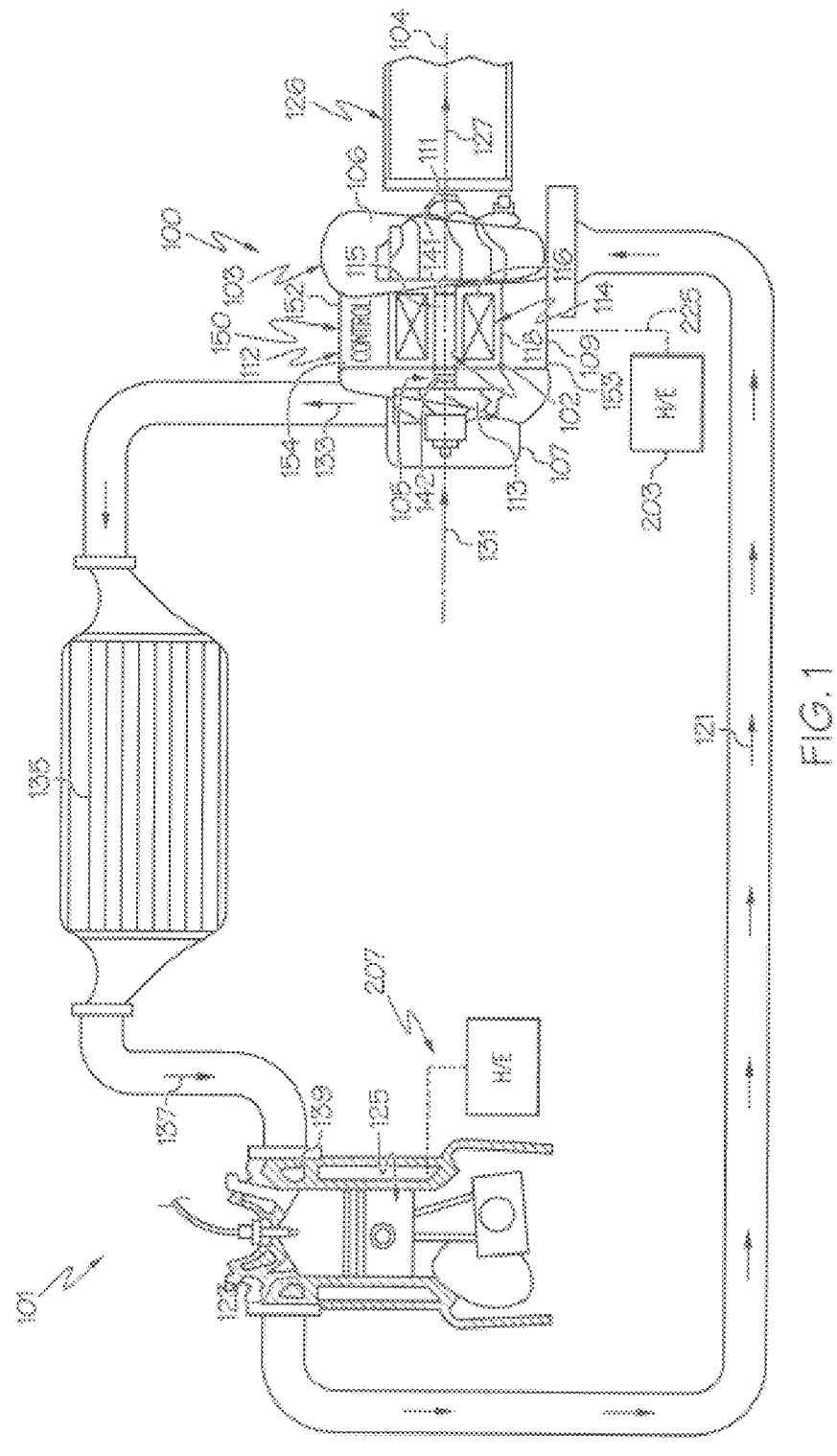
FIG. 1 illustrates an exemplary environment for application of an air cooled electric motor according to exemplary embodiments of the present disclosure.

FIG. 1 is a schematic view of an example turbomachine, such as a turbocharger 100 that is incorporated within an engine system 101 and that includes one or more features of the present disclosure. It will be appreciated that the turbocharger 100 could be another turbomachine (e.g., a supercharger, a turbine-less compressor device, etc.) in additional embodiments of the present disclosure. Furthermore, the turbomachine of the present disclosure may be incorporated into a number of systems other than an engine system without departing from the scope of the present disclosure. For example, the turbomachine of the present disclosure may be incorporated within a fuel cell system for compressing air that is fed to a fuel cell stack, or the turbomachine may be incorporated within another system without departing from the scope of the present disclosure.

Generally, the turbocharger 100 may include a housing 103 and a rotating group 102, which is supported within the housing 103 for rotation about an axis 104 by a bearing system 105. The bearing system 105 may be of any suitable type, such as a roller-element bearing or an air bearing system. As shown in the illustrated embodiment, the housing 103 may include a turbine housing 106, a compressor housing 107, and an intermediate housing 109. The intermediate housing 109 may be disposed axially between the turbine and compressor housings 106, 107.

Additionally, the rotating group 102 may include a turbine wheel 111, a compressor wheel 113, and a shaft 115. The turbine wheel 111 is located substantially within the turbine housing 106. The compressor wheel 113 is located substantially within the compressor housing 107. The shaft 115 extends along the axis of rotation 104, through the intermediate housing 109, to connect the turbine wheel 111 to the compressor wheel 113. Accordingly, the turbine wheel 111 and the compressor wheel 113 may rotate together as a unit about the axis 104.

The turbine housing 106 and the turbine wheel 111 cooperate to form a turbine stage (i.e., turbine section) configured to circumferentially receive a high-pressure and high-temperature exhaust gas stream 121 from an engine, specifically, from an exhaust manifold 123 of an internal combustion engine 125. The turbine wheel 111 and, thus, the other components of the rotating group 102 are driven in rotation around the axis 104 by the high-pressure and high-temperature exhaust gas stream 121, which becomes a lower-pressure and lower-temperature exhaust gas stream 127 that is released into a downstream exhaust pipe 126.

The compressor housing 107 and compressor wheel 113 form a compressor stage (i.e., compressor section). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized airstream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The pressurized airstream 133 may be channeled through an air cooler 135 (i.e., intercooler), such as a convectively cooled charge air cooler. The air cooler 135 may be configured to dissipate heat from the pressurized airstream 133, increasing its density. The resulting cooled and pressurized output air stream 137 is channeled into an intake manifold 139 of the internal combustion engine 125, or alternatively, into a subsequent-stage, in-series compressor.

Furthermore, the turbocharger 100 may include an e-machine stage 112. The e-machine stage 112 may be cooperatively defined by the intermediate housing 109 and by an e-machine 114 housed therein. The shaft 115 may extend through the e-machine stage 112, and the e-machine 114 may be operably coupled thereto. The e-machine 114 may be an electric motor, an electric generator, or a combination of both. Thus, the e-machine 114 may be configured as a motor to convert electrical energy to mechanical (rotational) energy of the shaft 115 for driving the rotating group 102. Furthermore, the e-machine 114 may be configured as a generator to convert mechanical energy of the shaft 115 to electrical energy that is stored in a battery, etc. As stated, the e-machine 114 may be configured as a combination motor/generator, and the e-machine 114 may be configured to switch functionality between motor and generator modes in some embodiments as well.

For purposes of discussion, the e-machine 114 will be referred to as a motor 116. The motor 116 may include a rotor member (e.g., a plurality of permanent magnets) that are supported on the shaft 115 so as to rotate with the rotating group 102. The motor 116 may also include a stator member (e.g., a plurality of windings, etc.) that is housed and supported within the intermediate housing 109. In some embodiments, the motor 116 may be disposed axially between a first bearing 141 and a second bearing 142 of the bearing system 105. Also, the motor 116 may be housed by a motor housing 118 of the intermediate housing 109. The motor housing 118 may be a thin-walled or shell-like housing that encases the stator member of the motor 116. The motor housing 118 may also encircle the axis 104, and the shaft 115 may extend therethrough.

Furthermore, the turbocharger 100 may include an integrated controller 150. The integrated controller 150 may generally include a controller housing 152 and a number of internal components 154 (e.g., circuitry, electronic components, cooling components, support structures, etc.) housed within the controller housing 152. The integrated controller 150 may control various functions. For example, the integrated controller 150 may control the motor 116 to thereby control certain parameters (torque, angular speed, START/STOP, acceleration, etc.) of the rotating group 102. The integrated controller 150 may also be in communication with a battery, an electrical control unit (ECU), or other components of the respective vehicle in some embodiments. More specifically, the integrated controller 150 may receive DC power from a vehicle battery, and the integrated controller 150 may convert the power to AC power for controlling the motor 116. In additional embodiments wherein the e-machine 114 is a combination motor/generator, the integrated controller 150 may operate to switch the e-machine 114 between its motor and generator functionality.

In some embodiments, the integrated controller 150 may be disposed axially between the compressor stage and the turbine stage of the turbocharger 100 with respect to the axis 104. Thus, as illustrated, the integrated controller 150 may be disposed and may be integrated proximate the motor 116. For example, as shown in the illustrated embodiment, the integrated controller 150 may be disposed on and may be arranged radially over the motor housing 118. More specifically, the integrated controller 150 may extend and wrap about the axis 104 to cover over the motor 116 such that the motor 116 is disposed radially between the shaft 115 and the integrated controller 150. The integrated controller 150 may also extend about the axis 104 in the circumferential direction and may cover over, overlap, and wrap over at least part of the motor housing 118. In some embodiments, the integrated controller 150 may wrap between approximately forty-five degrees (45°) and three-hundred-sixty-five degrees (365°) about the axis 104.

As illustrated, the housing 152 may generally be arcuate so as to extend about the axis 104 and to conform generally to the rounded profile of the turbocharger 100. The housing 152 may also be an outer shell-like member that is hollow and that encapsulates the internal components 154. Electrical connectors may extend through the housing 152 for electrically connecting the internal components 154. Furthermore, there may be openings for fluid couplings (e.g., couplings for fluid coolant). Additionally, the controller housing 152 may define part of the exterior of the turbocharger 100. An outer surface 153 of the controller housing 152 may extend about the axis 104 and may face radially away from the axis 104. The outer surface 153 may be at least partly smoothly contoured about the axis 102 as shown, or the outer surface 153 may include one or more flat panels that are arranged tangentially with respect to the axis 104 (e.g., a series such flat panels that are arranged about the axis 104). The outer surface 153 may be disposed generally at the same radius as the neighboring compressor housing 107 and/or turbine housing 106. Accordingly, the overall size and profile of the turbocharger 100, including the controller 150, may be very compact.

The internal components 154 may be housed within the controller housing 152. Also, at least some of the internal components 154 may extend arcuately, wrap about, and/or may be arranged about the axis 104 as will be discussed. Furthermore, as will be discussed, the internal components 154 may be stacked axially along the axis 104 in close proximity such that the controller 150 is very compact. As such, the integrated controller 150 may be compactly arranged and integrated with the turbine stage, the compressor stage, and/or other components of the turbocharger 100. Also, internal components 154 of the controller 150 may be in close proximity to the motor 116 to provide certain advantages. For example, because of this close proximity, there may be reduced noise for more efficient control of the motor 116.

Furthermore, the controller 150 may include a number of components that provide robust support and that provide efficient cooling. Thus, the turbocharger 100 may operate at extreme conditions due to elevated temperatures, mechanical loads, electrical loads, etc. Regardless, the controller 150 may be tightly integrated into the turbocharger 100 without compromising performance.

Figure 2:
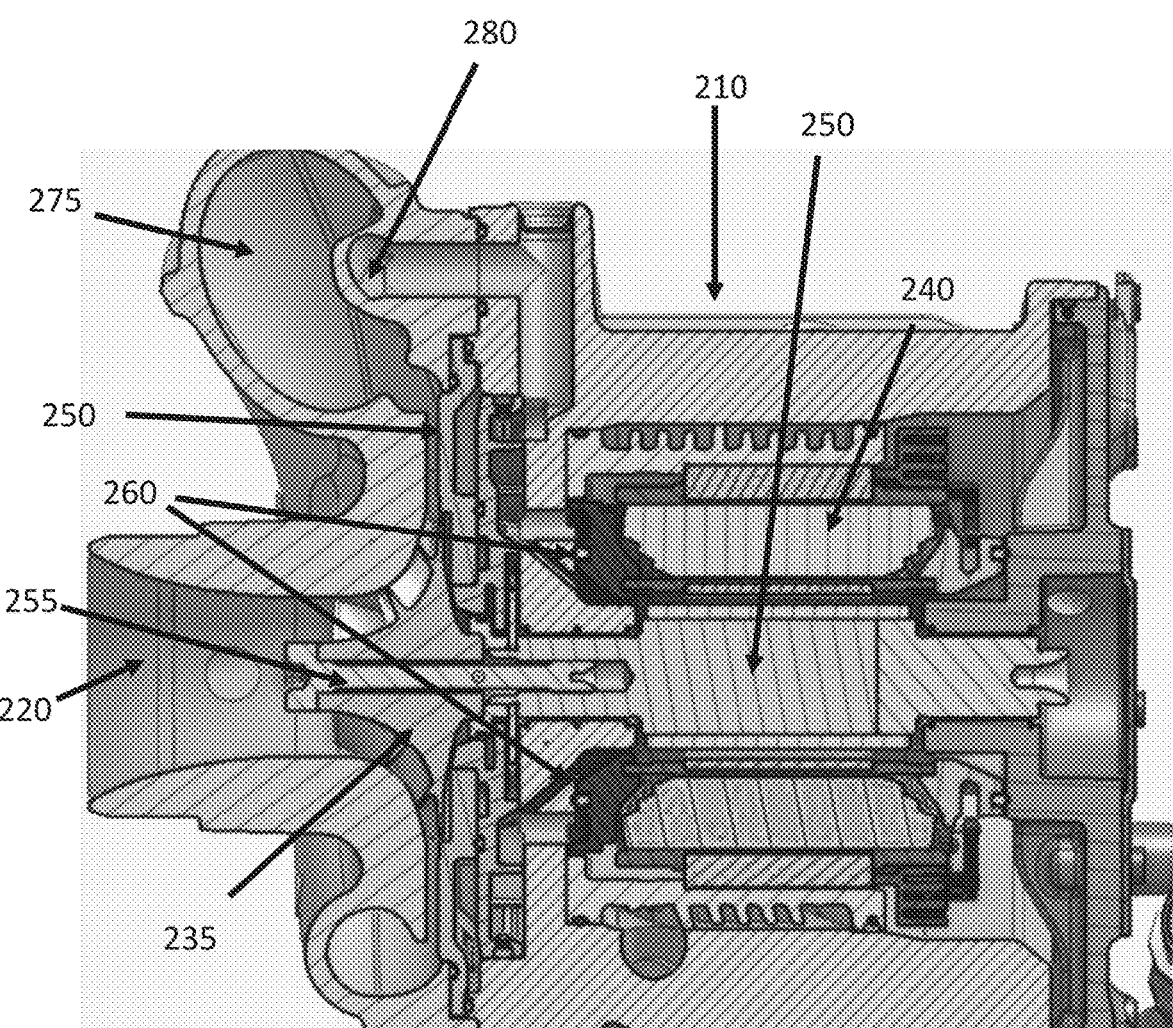
FIG. 2 shows an exemplary cross-sectional view of an electric motor driven centrifugal compressor according to exemplary embodiments of the present disclosure.

Turning now to FIG. 2, an exemplary cross-sectional view of an electric motor driven centrifugal compressor 200 according to exemplary embodiments of the present disclosure is shown. The exemplary compressor 200 is a centrifugal compressor driven by an integrated electric motor. The centrifugal compressor includes an outer motor housing 210. The electric motor includes a plurality of stator windings 240 and a rotor 250 mechanically coupled to a drive bolt 255. The drive bolt 255 drives an impeller 235 of the centrifugal compressor 200.

The electric motor is typically driven by a three-phase alternating electric current (AC). The stator windings 240, typically arranged in a three-phase configuration for efficient power delivery, generate a rotating magnetic field when supplied with three-phase AC. This magnetic field rotates due to the phase offset between the currents. The rotor 250, a conductive cage or wound design, experiences the changing magnetic field generated the stator. This rotating magnetic field induces a current in the rotor 250, which in turn generates its own magnetic field. The interaction between these fields creates a torque that propels the rotor 250 in the same direction as the stator's rotating magnetic field. The rotor is mechanically coupled to the drive bolt 255 which is rotated along with the rotor 250 in response to the rotating magnetic fields.

The drive bolt 255 is mechanically coupled to the impeller 235 mounted in the compressor intake 220. The impeller 235 has a central hub and radially extending vanes that are rotated by the drive bolt 255. The rotating impeller 235 is operative to draw a fluid, such as air, into the compressor intake 220, accelerate the fluid using the vanes, and outputs the accelerated fluid into the compressor output 275. The acceleration of the fluid increases the velocity of the fluid which is then coupled to a volute stage to increase the pressure of the gas. In some exemplary embodiments, the fluid can be a gas, such as air.

According to some exemplary embodiments, a portion of the compressed fluid at the compressor output 275 is tapped and routed through a stator cooling inlet 280 to be used for stator system. In some exemplary embodiments, the compressed fluid can be used for stator cooling, rotor cooling and/or bearing cooling. A portion of the compressed fluid is routed via a plurality of conduits within the motor housing to a chamber having at least one surface orthogonal to the axis of rotation of the rotor 250. In some exemplary embodiments, the chamber can be located between the impeller 235 and the electric motor. The orthogonal surface can be a stator insert 260 configured with a plurality of holes to direct the portion of the trapped fluid into each of the plurality of stator windings 240 and gaps between the stators 240. The area of the holes can be configured to regulate the fluid flow through each of the plurality of holes to achieve a desired level of stator cooling while maintaining a desired flow rate. Alternatively, compressed fluid can be provided to the stator insert 260 by any source of compressed fluid and/or any external compressed fluid source, such as a compressor or pressurized fluid reservoir.

In some exemplary embodiments, the stator insert 260 can be a discrete component affixed to the motor housing 210 during fabrication. Alternatively, the stator insert 260 can be formed from a portion of the motor housing 210. The motor housing 210 can be further configured to return the fluid through a stator rotor junction after the fluid has flowed through the stators windings 240 and/or the gaps between the stator windings 240.

Figure 3:
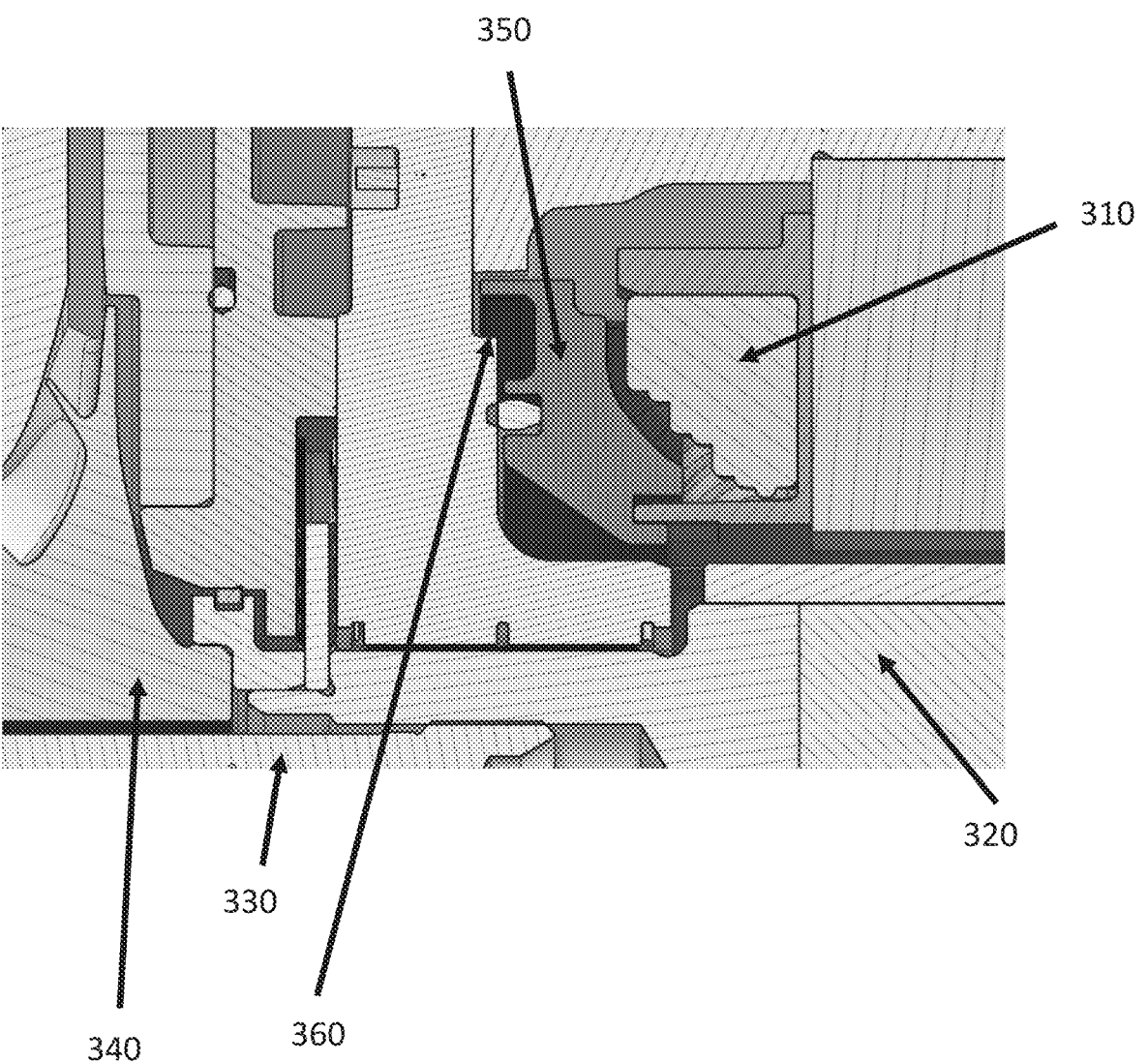
FIG. 3 shows an exemplary cross-sectional view of an exemplary stator cooling configuration according to exemplary embodiments of the present disclosure.

Turning now to FIG. 3, a cross sectional view of an exemplary stator cooling configuration 300 of a centrifugal compressor according to exemplary embodiments of the present disclosure is shown. The exemplary view is illustrative of the stator winding 310, the rotor 320, the rotational shaft 330, the impeller, the stator insert 350 and the chamber 360. A portion of the compressed gas generated by the impeller 340 is tapped into a stator cooling inlet and into the chamber 360. The chamber 360 is configured to distribute the compressed gas over the compressor side surface of the stator insert 350. The compressed gas is then channeled through holes in the stator insert 350 into the stator windings 310 and spaces between the stator windings. The configuration of the chamber 360 and the size and location of the holes in the stator insert 350 can be configured to balance the airflow and regulate the gas flow through the holes, stator windings 310 and the spaces between the stator windings 310.

Figure 4:
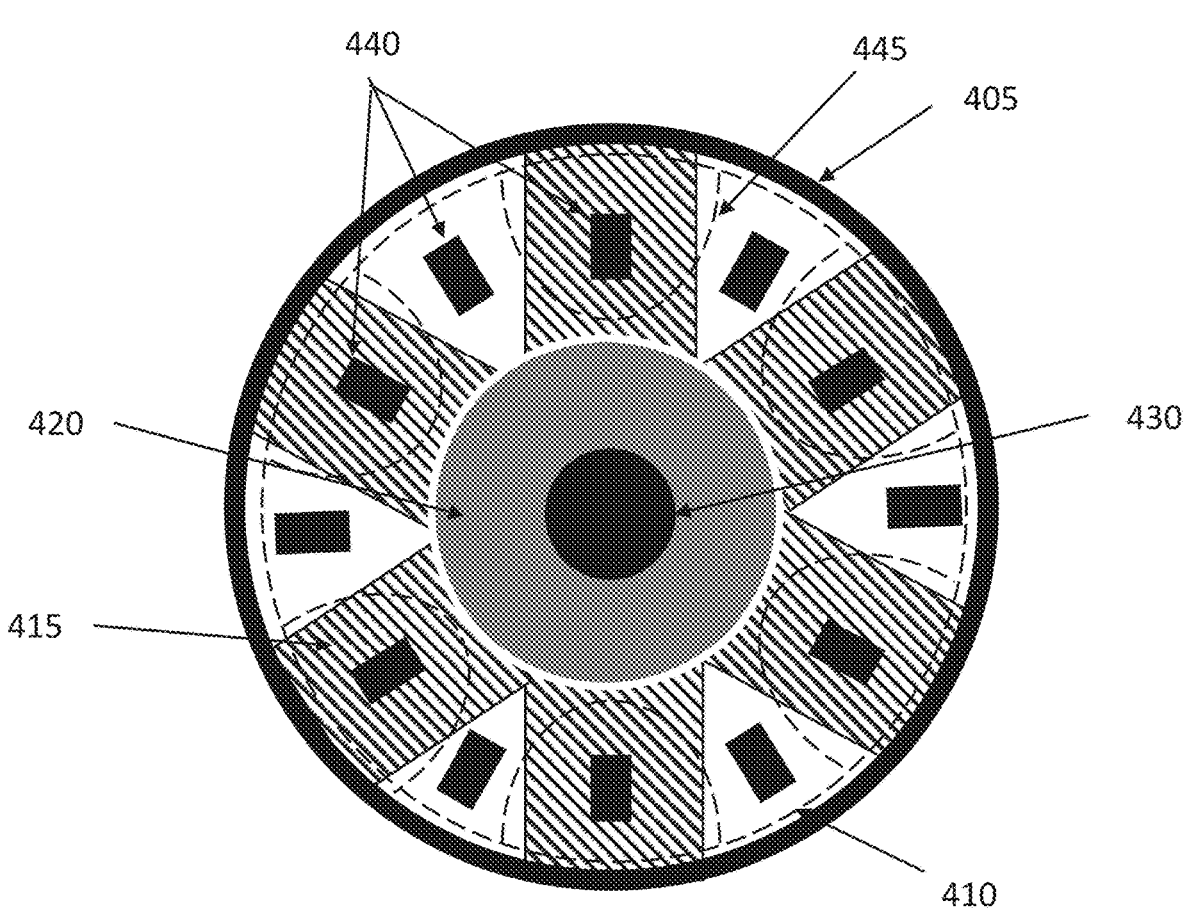
FIG. 4 shows an exemplary cross sectional view of an exemplary electric motor portion according to exemplary embodiments of the present disclosure.

Turning now to FIG. 4, a cross sectional view of an exemplary electric motor portion 400 of a centrifugal compressor according to exemplary embodiments of the present disclosure is shown. The stator insert (dotted line) 410 is shown affixed within the motor housing 405 at one end of the electric motor. The stator insert 410 includes a plurality of holes 440 with some of the holes 440 aligned with stator windings 415 and some of the holes aligned with spaces between the stator windings 415. The electric motor portion 400 is further configured with a rotor 420 and a rotating shaft 430. In some exemplary embodiments, the size and/or number of holes can be modified to balance the flow of compressed gas. Likewise, the holes can be circular, square, rectangular, or irregularly shaped. The area of the holes aligned with the spaces can have the same area as the holes aligned with the stator windings 415. Alternatively, the area of the holes aligned with the spaces can have a greater area or a smaller area than the holes aligned with the stator windings 415. The stator insert 410 can further include surface contours 445. For example, the surface of the stator insert 410 closest to the electric motor can include contours 445 that partially engage with the sides of the stator windings 415 to further control the compressed gas flow through the stator windings. Likewise, the surface of the stator insert distal to the electric motor can include contours to direct the flow of compressed gas to the various holes 440.

Figure 5:
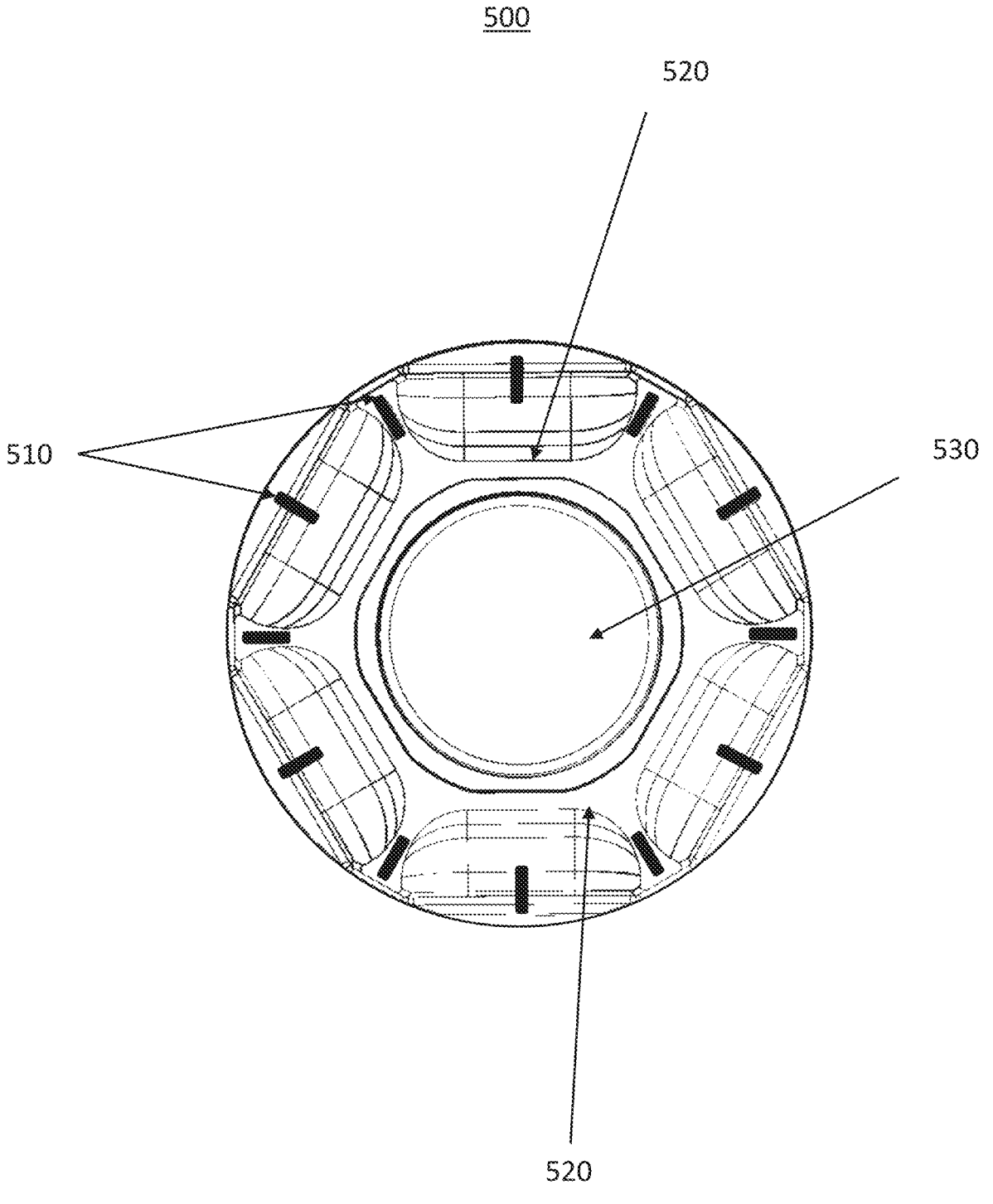
FIG. 5 shows an exemplary stator insert according to exemplary embodiments of the present disclosure.

Turning now to FIG. 5, a view of an exemplary stator insert 500 according to exemplary embodiments of the present disclosure is shown. The stator insert 500 is configured to be positioned orthogonal to an axis of rotation of the rotor of the electric motor. When engaged with the electric motor, the rotating shaft passes through a shaft aperture 530. In some exemplary embodiments a clearance between the rotating shaft and the surface of the shaft aperture 530 is small enough to restrict gas flow through the gap.

The exemplary stator insert 500 is configured with a plurality of holes for directing compressed gas tapped from a compressor output to a plurality of stator windings and a plurality of gaps between stator windings. The exemplary stator insert 500 shows six contours 520 for engaging a portion of the stator winding. The stator insert 500 can be configured with any number of contours 520 depending on the number of stator windings or the configuration and/or geometry of the electric motor. Each of the plurality of holes has an area and shape configured to regulate a flow rate of the compressed gas to each of the plurality of stator windings and the plurality of gaps between stator windings. In some exemplary embodiments, the holes coupling compressed gas to the plurality of stator windings can have a greater area than the holes coupling compressed gas to the plurality of gaps between stator windings.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A compressor comprising:
an impeller for generating a compressed fluid;
a motor housing having an inlet for receiving the compressed fluid;
an electric motor including a plurality of stator windings, a rotor and a shaft mechanically coupled to the rotor; and
a stator insert having
a plurality of recessions configured to partially encapsulate respective portions of each stator winding;
a plurality of protrusions extending into gaps between adjacent stator windings;
a first plurality of holes disposed at said plurality of recessions, each of the first plurality of holes configured to regulate a flow of the compressed fluid through a corresponding stator winding;
a second plurality of holes disposed at said plurality of protrusions, each of the second plurality of holes configured to regulate a flow of the compressed fluid through a corresponding gap between adjacent stator windings; and
an extension portion extending between adjacent stator windings and supporting said second plurality of holes, and
wherein said stator insert further comprises an integrated bearing support for supporting an outer race of a bearing.

2. The compressor of claim 1 wherein the stator insert regulates the flow of the compressed fluid in a direction parallel to an axis of rotation of the rotor and shaft.

3. The compressor of claim 1 wherein the stator insert is installed between the impeller and the electric motor and wherein the shaft passes through a race within the stator insert.

4. The compressor of claim 1 wherein a first portion of the compressed fluid flows through the plurality of stator windings and a second portion of the compressed fluid flows within the plurality of gaps between the plurality of stator windings.

5. The compressor of claim 1 wherein the stator insert includes a first plurality of holes aligned with the plurality of stator windings and a second plurality of holes aligned with the plurality of gaps between the plurality of stator windings and wherein the area of the first plurality of holes is greater than the area of the second plurality of holes.

6. The compressor of claim 1 wherein the stator insert includes a plurality of recessions for partially encapsulating a portion of each of the plurality of stator windings and wherein a plurality of protrusions between the plurality of recessions extend into each of the gaps between the plurality of stator windings and wherein the stator insert includes a hole at each of the plurality of protrusions for regulating the flow of compressed fluid through the gaps between the plurality of stator windings.

7. The compressor of claim 1 wherein the stator insert includes a first plurality of holes aligned with the plurality of stator windings and a second plurality of holes aligned with the plurality of gaps between the plurality of stator windings and wherein the area of the first plurality of holes is the same as the area of the second plurality of holes.

8. The compressor of claim 1 wherein the stator insert further includes an outer race for holding a bearing to support the shaft.

9. The compressor of claim 1 wherein each of the plurality of holes is distributed radially at an equal radius from a center of the stator insert.

10. A method of cooling an electric motor in a compressor comprising:

compressing a fluid to generate a compressed fluid; and regulating a flow of the compressed fluid through a plurality of stator windings and a plurality of gaps between the stator windings by passing the compressed fluid through a stator insert, wherein the stator insert comprises a plurality of recessions configured to partially encapsulate respective portions of each stator winding and a plurality of protrusions extending into a plurality of gaps between adjacent stator windings, wherein the stator insert includes a first plurality of holes disposed at the recessions and aligned with the stator windings, and a second plurality of holes disposed at the protrusions and aligned with the gaps between the stator windings, wherein the stator insert further comprises at least one extension portion that extends between adjacent stator windings and supports at least one of the second plurality of holes, and wherein the stator insert comprises an integrated bearing support for supporting an outer race of a bearing.

11. The method of cooling the electric motor in the compressor of claim 10 wherein a total area of the first plurality of holes is equal to a total area of the second plurality of holes.

12. The method of cooling the electric motor in the compressor of claim 10 wherein a total area of the second plurality of holes is greater than the total area of the first plurality of holes.

13. The method of cooling the electric motor in the compressor of claim 10 wherein the stator insert regulates the flow of the compressed fluid in a direction parallel to an axis of rotation of a rotor of the electric motor.

14. The method of cooling the electric motor in the compressor of claim 10 wherein the electric motor is configured to drive the impeller of the compressor and wherein the compressed fluid is tapped from a volute of the compressor.

15. The method of cooling the electric motor in the compressor of claim 10 wherein an extended portion of the stator insert extends between the plurality of stator windings into the gaps between the stator windings and wherein the second plurality of holes are located on the extension portion.

16. The method of cooling the electric motor in the compressor of claim 10 wherein a shaft of the electric motor passes through the stator insert and is mechanically coupled to the impeller.

17. The method of cooling the electric motor in the compressor of claim 10 wherein the stator insert is installed between the impeller and the electric motor and wherein a shaft passes through a race within the stator insert between the impeller and the electric motor.

18. The method of cooling an electric motor in a compressor of claim 10 wherein the stator insert is formed in a portion of a motor housing of the electric motor and wherein the stator insert further includes an outer race for holding a bearing to support a shaft of the electric motor.

19. A compressor comprising:

an impeller disposed within an impeller housing for compressing a fluid to generate a compressed fluid within a volute;

a motor housing mechanically coupled to the impeller housing, wherein the motor housing includes an inlet for receiving the compressed fluid from the volute;

an electric motor having a plurality of stator windings, a rotor and a shaft, wherein the shaft is mechanically coupled to the impeller and the rotor; and a stator insert disposed between the impeller and the electric motor, the stator insert comprising, a plurality of recessions configured to partially encapsulate respective portions of each stator winding;

a plurality of protrusions extending into gaps between adjacent stator windings;

a first plurality of holes disposed at said recessions and aligned with the plurality of stator windings;

a second plurality of holes disposed at said protrusions and aligned with the plurality of gaps between adjacent stator windings;

an extension portion that extends between adjacent stator windings and supports at least one of the second plurality of holes; and an integrated bearing support for supporting an outer race of a bearing; and wherein the stator insert receives the compressed fluid from the inlet and regulates the flow of the compressed fluid through the plurality of stator windings via the first plurality of boles and through the plurality of gaps between the stator windings via the second plurality of boles.

20. The compressor of claim 19 wherein a total area of the first plurality of holes is equal to a total area of the second plurality of holes and wherein an extended portion of the stator insert extends between the plurality of stator windings into the plurality of gaps between the stator windings and wherein the second plurality of holes are located on the extended portion.

* * * * *